May 19, 1942.  C. F. JOHNSON  2,283,259
VALVE
Filed Sept. 9, 1940  2 Sheets-Sheet 1

Charles F. Johnson.
INVENTOR.
BY
ATTORNEYS.

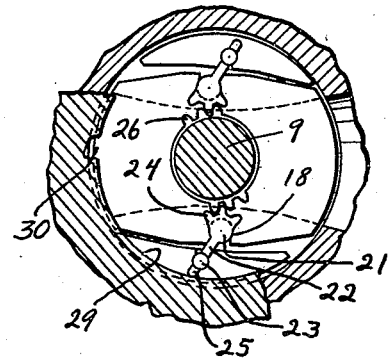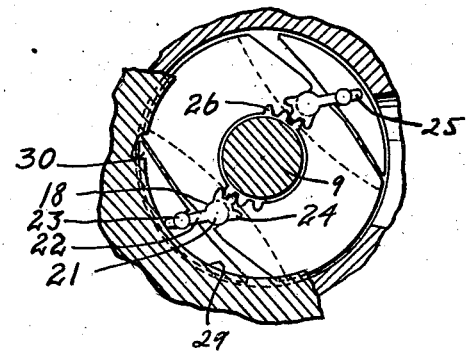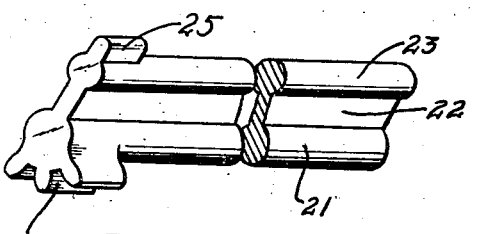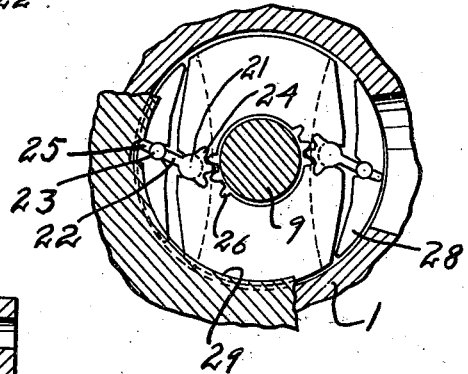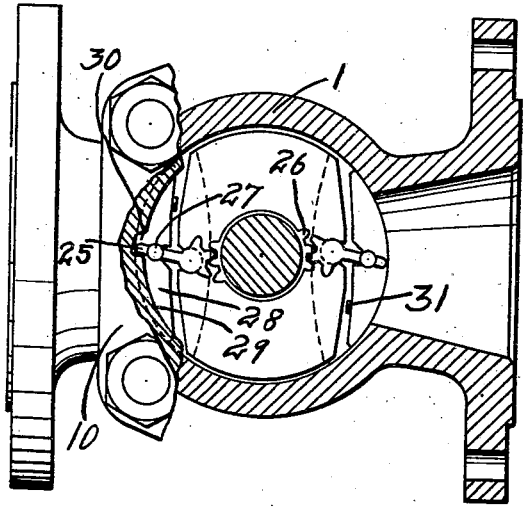

Patented May 19, 1942

2,283,259

UNITED STATES PATENT OFFICE 2,283,259

VALVE

Charles F. Johnson, Houston, Tex., assignor to Reed Roller Bit Company, Houston, Tex., a corporation of Texas Application September 9, 1940, Serial No. 355,940

8 Claims. (Cl. 251—102)

This invention relates to valves and has for its general object a provision for a valve of the plug type which may be easily opened and closed under high pressure operating conditions.

It is a more specific object of this invention to provide a construction having closure members adapted to close a passage through a valve body to shut off the flow of fluid therethrough, together with means for moving the closure member directly away from its seat prior to any lateral movement thereof, and of holding the closure member away from its seat while it is moved laterally to its open position in which it does not overlie the seat.

Another object of this invention is to provide a valve in which the closure member cannot seat against the inner wall of a valve body except when the same is in position to close the fluid passage through such valve body.

Another object of this invention is to provide a means for positively moving the closure member directly away from its seat and then moving it laterally from its seat while holding it positively out of engagement therewith.

Other objects and advantages will become apparent from the following description taken in connection with the accompanying drawings wherein is set forth by way of example one embodiment of this invention.

In the drawings:

Fig. 2 is a similar cross section but taken at right angles to Fig. 1 and showing the carrier and closure segments in top plan with the segments in closed position;

Fig. 3 is a fragmentary portion of a view similar to Fig. 2 but showing the segments in position they occupy when partly open;

Fig. 4 is a view similar to Fig. 3 but showing the segments in fully open position;

Fig. 5 is a view similar to Figs. 3 and 4 but showing the segments in the position they occupy just before they reach closed position;

Fig. 6 is an enlarged perspective of one of the toggle links on which the closure segments of this invention are carried;

Figure 1:
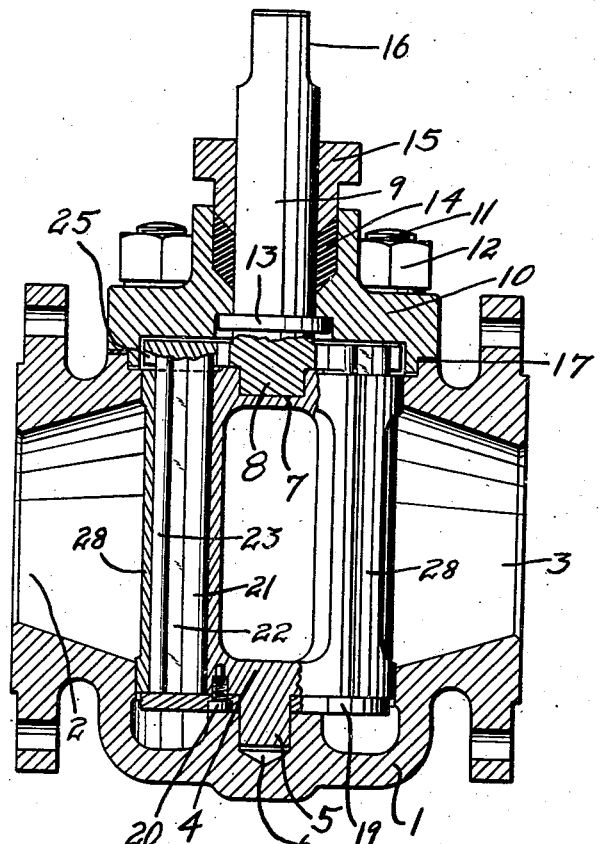
Fig. 1 is a longitudinal cross section through a valve constructed in accordance with this invention.

The valve illustrated employs a valve body 1 having fluid flow openings 2 and 3 therein, either of which may serve as the inlet or the outlet.

Transversely through the body 1 is a valve chamber adapted to receive a valve carrier 4, which has a projecting bearing part 5 at one end adapted to fit into a bearing socket in the body 1 and which has a depression 7 at its opposite end adapted to receive a projection 8 on the inner end of the valve operating stem 9. It will be understood that the stem 9 is rotatable with respect to the carrier 4.

The upper end of the valve chamber is closed about the stem 9 by means of a bonnet 10 held in place by studs 11 and nuts 12, or by any other suitable arrangement. The stem 9 has a bearing flange 13 just underneath the bonnet 10 to take the thrust caused by the pressure within the valve body and to limit the outward movement of the stem 9. Leakage about the stem 9 is prevented by means of a packing 14 held in place by a gland 15. The outer end of the stem 9 is provided with a non-circular portion 16 adapted to receive a wrench or wheel for rotating the stem. Leakage between the bonnet 10 and the body 1 is prevented by means of a gasket 17 or the like.

On its opposite sides the carrier is provided with longitudinally extending grooves 18 and these grooves are closed at one end of the carrier by means of a plate 19, which is held against rotation with respect to the carrier by means of a screw 20.

Fitted within the grooves 18, which are of circular cross section and consist of more than a semicircle, are the circular enlargements 21 along one edge of each of the links 22. Along the opposite edge of these links is a second circular enlargement 23 for a purpose presently to be described.

At one end of each of the enlargements 21 the links 22 are formed with segmental pinion gears having teeth 24 projecting toward the axis of the carrier. These teeth are disposed just above the upper end of the carrier as the same is shown in Fig. 1. Each of the links 22 is also provided at the same end and projecting outwardly from the enlargement 23 with a projection 25.

Each of the segmental pinion gears 24 is adapted to mesh with a corresponding segmental gear 26 upon the stem 9, so that when the stem 9 is rotated with respect to the carrier 4 the links 22 will be caused to pivot about the axes of the enlargements 21.

Each of the enlargements 23 is adapted to be received in a groove 27 in one of the closure members or segments 28, the grooves 27 likewise being of circular cross section, and greater than a semicircle. Thus, it will be seen that the links 22 will serve to hold the segments 28 against radial movement toward or away from the carrier 4 except when the links 22 are swung about the axes of the enlargements 21 in the manner just described.

Each of the projections 25 is positioned opposite an inwardly extending shoulder 29 in the bonnet 10, and this shoulder is preferably continuous throughout the circumference of the valve chamber with the exception that it is provided with notches 30 in a position such that the projections 25 may enter the notches 30 when the segments 28 directly overlie the openings 2 and 3.

Each of the segments is also provided with an abutment 31 on its rear surface adjacent the edge which trails as the valve is opened, these abutments being for the purpose of limiting the swinging movement of the segments with respect to the carrier as the valve is opened.

Figure 8:
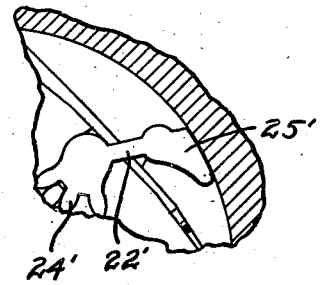
Fig. 8 is an enlarged fragmentary view illustrating the application of the modification shown in Fig. 7.
Figure 7:
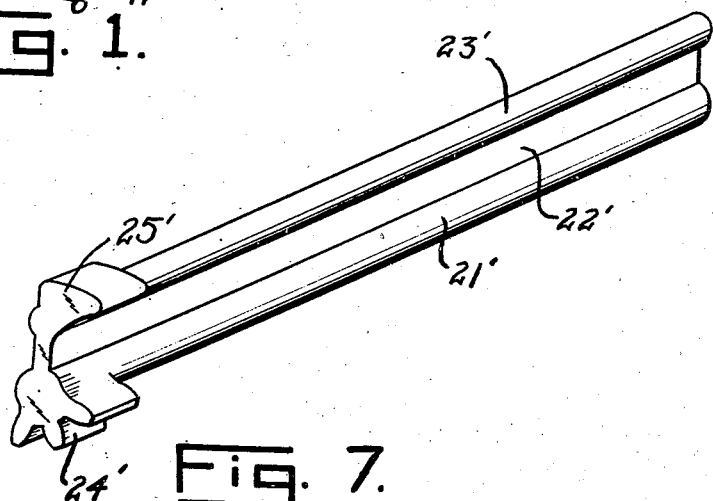
Fig. 7 is a view similar to Fig. 6 but showing a slight modification.

The form illustrated in Figs. 7 and 8 is substantially the same as that just described with the exception that the projections 25' on the link corresponding to the projection 25 is of such a form as to present a sliding surface of substantial extent to bear upon the shoulder 29. Each of the links 22' shown in Figs. 7 and 8 have enlargements 21' corresponding to the enlargements 21 of the part shown in Fig. 6 and enlargements 23' corresponding to the enlargements 23 of the part shown in Fig. 6. Each of these links also have segmental pinion gears 24' corresponding to the segmental pinion gear 24 of the part shown in Fig. 6.

In operation, the devices just described are in substance identical. Let it be assumed that the valve is in closed position as illustrated in Fig. 2 and that it is desired to open the valve. The stem 9 will be rotated to the left. Inasmuch as the carrier 4 cannot rotate without the rotation of the links 22 because of the engagements of the projections 25 with the notches 30, the stem 9 will rotate while the carrier 4 remains substantially stationary. This rotation of the stem 9 will act through the gears 24 and 26 to cause rotation of the links 22 about the axes of the enlargements 21. This will, of course, serve to move the enlargements 23 and the segments 28 closer to the axis of the carrier 4 and thus to unseat the segments 28 in a direction directly away from their respective seats. As soon as this rotation of the links 22 has proceeded a sufficient amount, the projections 25 will be disengaged from the notches 30 and will thereafter ride upon the shoulder 29. The valve is shown in Fig. 3 in partly open position. It will be seen in this figure that at this point the abutments 31 are in engagement with the carrier, thus limiting the swinging movement of the segments 28. As soon as the projections 25 ride up on the shoulder 29 and out of the notches 30, the entire carrier and segment assembly may be rotated by a continued rotation of the stem 9. Eventually the valve will reach the fully open position shown in Fig. 4. It will be noted that at all times, except when the segments are in position overlying the openings 2 and 3, these segments will be held away from the walls of the valve chamber.

If it now be desired to close the valve just referred to, the stem is rotated to the right and because the links 22 cannot swing outwardly with respect to the carrier 4 they will be slid around in the position shown in Fig. 3 until the projections 25 come to the notches 30 whereupon the links 22 will be permitted to swing outwardly and will in fact be caused to swing outwardly upon continued rotation of the carrier by virtue of the engagement of the projections 25 with the notches 30. This outward swinging movement causes the rotary travel of the outer ends of the links with the carrier to cease and further rotation of the stem 9 will through engagement of the gears 24 and 26 cause the carrier to move a little farther and the links 22 to swing about the axes of the enlargements 21, thus moving the segments 28 outwardly until they are fully and forcibly seated.

From the foregoing it will be seen that a structure has been provided in which the valve closure members cannot be moved laterally with respect to their seats without first being moved directly away from their seats. This eliminates the tremendous friction, which is ordinarily set up, between the closure members and their seats under high pressure and which friction unless compensated for in some manner renders a valve of ordinary construction substantially unusable under high pressure. It will further be seen that in the structure provided the closure members or segments are positively moved away from their seats and are held out of contact with the valve chamber walls at all times except when they are in position to be fully seated and close the valves.

Having described my invention, I claim:

1. In a valve, a valve body having fluid flow openings and a valve chamber transversely thereof, a carrier rotatably mounted in said chamber, a closure member on said carrier adapted to close one of said openings, toggle link means connecting said closure member to said carrier, means for rotating said carrier and closure member to and from closed position and operative in opening said valve to initially swing said toggle with respect to said carrier and draw said closure member away from its seat and then to rotate said carrier and said closure member as a unit to open position, and means on said toggle link means for holding said closure member out of seating engagement with the wall of said chamber when said member is not in position to register with said openings.

2. In a valve, a valve body having fluid flow openings and a valve chamber transversely thereof, a carrier rotatably mounted in said chamber, a closure member on said carrier adapted to close one of said openings, toggle link means connecting said closure member to said carrier, an operating stem mounted on the same axis as said carrier and rotatable with respect thereto, gear teeth on said stem and on the inner ends of said toggle link means whereby upon rotation of said stem with respect to said carrier in a direction to open said valve, said toggles will be swung with respect to said carrier in a direction to draw said closure member away from its seat, and whereby upon reaching the limit of such swinging movement further rotation of said stem will rotate said carrier and closure member as a unit to open position, and means carried by said toggle link means and the wall of said chamber for holding said closure member out of seating engagement with the wall of said chamber when said member is not in position to register with said opening.

3. In a valve, a valve body having fluid flow openings and a valve chamber transversely thereof, a carrier rotatably mounted in said chamber, a closure member on said carrier adapted to close one of said openings, toggle link means connecting said closure member to said carrier, means for rotating said carrier and closure member to and from closed position and operative in opening said valve to initially swing said toggle with respect to said carrier and draw said closure member away from its seat and then to rotate said carrier and said closure member as a unit to open position, and rails on the interior of said body engageable with a part carried by said toggle link means for holding said closure member out of seating engagement with the wall of said chamber when said member is not in position to register with said opening.

4. In a valve, a valve body having fluid flow openings and a valve chamber transversely thereof, a carrier rotatably mounted in said chamber, a closure member on said carrier adapted to close one of said openings, toggle link means connecting said closure member to said carrier, means for rotating said carrier and closure member to and from closed position and operative in opening said valve to initially swing said toggle with respect to said carrier and draw said closure member away from its seat and then to rotate said carrier and said closure member as a unit to open position, and rails on the interior of said body engageable with a part carried by said toggle link means for holding said closure member out of seating engagement with the wall of said chamber when said member is not in position to register with said opening, said rails being interrupted at the position which said toggle means occupies when said closure member exactly overlies said opening.

5. In a valve, a valve body having fluid flow openings and a valve chamber transversely thereof, a carrier rotatably mounted in said chamber, a closure member on said carrier adapted to close one of said openings, toggle links pivotedly connecting the opposite ends of said closure member to said carrier, means for rotating said carrier and closure member to and from closed position, said toggle links having projections thereon adapted to contact portions on the inner walls of said chamber and hold said closure member out of contact with such walls except when said closure member is in a position exactly overlying said opening, and the walls of said chamber having parts adapted to accommodate said projections and permit said closure member to seat when it is in a position exactly overlying said opening.

6. In a valve, a valve body having fluid flow openings and a valve chamber transversely thereof, a carrier rotatably mounted in said chamber, a closure member on said carrier adapted to close one of said openings, toggle link means connecting said closure member to said carrier, means for rotating said carrier and closure member to and from closed position, and means on said toggle link means and the wall of said chamber for preventing the outer end of said toggle means from moving circumferentially with respect to said body until it has moved radially to unseat said closure member, and means for initially moving the outer end of said toggle means in a radial inward direction without substantial circumferential movement and then moving it circumferentially without substantial radial movement during the opening of the valve.

7. In a valve, a valve body having fluid flow openings and a valve chamber transversely thereof, a carrier rotatably mounted in said chamber, a closure member on said carrier adapted to close one of said openings, toggle links connecting said closure member to said carrier, means for rotating said carrier and closure member to and from closed position, means carried by said toggle links and the wall of said chamber for preventing said closure member from moving circumferentially until it first moves radially, and means for initially moving said closure member radially without substantial circumferential movement and then for moving it circumferentially without radial movement during the opening of said valve.

8. In a valve, a valve body having fluid flow openings and a valve chamber transversely thereof, a carrier rotatably mounted in said chamber, a closure member on said carrier adapted to close one of said openings, toggle link means connecting said closure member to said carrier, means for rotating said carrier and closure member to and from closed position, means on said toggle link means and the wall of said chamber for stopping further circumferential movement of the outer end of said toggle means when said closure member on closing movement reaches a position overlying said opening, and means for causing radial movement without circumferential movement of the outer end of said toggle means when it has been so stopped to cause the seating of said closure member.

CHARLES F. JOHNSON.